United States Patent
Zhang et al.

(10) Patent No.: US 10,195,974 B2
(45) Date of Patent: Feb. 5, 2019

(54) DETENT FOR VEHICLE ARMREST

(71) Applicant: Lear Corporation, Southfield, MI (US)

(72) Inventors: Xuefei Zhang, Shanghai (CN);
Xiangbin Hu, Shanghai (CN);
XiaoZhong Wu, Shanghai (CN)

(73) Assignee: Lear Corporation, Southfield, MI (US)

( * ) Notice: Subject to any disclaimer, the term of this patent is extended or adjusted under 35 U.S.C. 154(b) by 130 days.

(21) Appl. No.: 15/380,037

(22) Filed: Dec. 15, 2016

(65) Prior Publication Data

US 2018/0170220 A1 Jun. 21, 2018

(51) Int. Cl.
*B60N 2/75* (2018.01)

(52) U.S. Cl.
CPC ................... *B60N 2/753* (2018.02)

(58) Field of Classification Search
None
See application file for complete search history.

(56) References Cited

U.S. PATENT DOCUMENTS

| | | | |
|---|---|---|---|
| 4,882,807 A * | 11/1989 | Frye | ........................ E05D 11/06 16/225 |
| 4,953,259 A | 9/1990 | Frye et al. | |
| 5,669,107 A | 9/1997 | Carlsen et al. | |
| 6,132,128 A * | 10/2000 | Burrows | ................ B60N 2/753 403/96 |
| 6,427,956 B1 * | 8/2002 | Heckmann | ............. B60N 2/753 248/118 |
| 7,380,852 B2 * | 6/2008 | Vander Kuyl | ............ B60R 7/04 296/24.34 |
| 8,960,786 B2 | 2/2015 | Henke et al. | |
| 9,022,328 B2 | 5/2015 | Mayer | |

FOREIGN PATENT DOCUMENTS

DE 102004020911 B4 9/2010

* cited by examiner

*Primary Examiner* — David E Allred
(74) *Attorney, Agent, or Firm* — MacMillan, Sobanski & Todd, LLC

(57) ABSTRACT

An armrest assembly includes a frame. The armrest assembly also includes an armrest mounted on the frame for relative rotational movement between a first position and a second position. A stop rod is mounted on one of the frame and the armrest. A detent mounted on the other of the frame and the armrest. The detent includes a first stop indent and a second stop indent. The stop rod is located in the first stop indent when the armrest is in the first position. The stop rod is located in the second stop indent when the armrest is in the second position. The detent includes a deflection arm supported on a detent base. The detent includes an arm space between the deflection arm and the detent base. The detent includes a detent bumper located in the detent space.

16 Claims, 4 Drawing Sheets

DETENT FOR VEHICLE ARMREST

BACKGROUND OF THE INVENTION

The present invention relates in general to a detent for a vehicle armrest and, more specifically, to a detent for a vehicle armrest that includes multiple stop positions.

Vehicles, such as passenger cars, typically include armrests for the comfort of vehicle occupants. Often, in vehicles with a bench-type seat, a center armrest is provided that may be moved between a lowered use position and a raised stowed position. In the use position, the armrest is available for use by occupants on either side of the armrest, while in the stowed position, the center portion of the seat is available for use by a third occupant, for example.

It is desirable that the armrest be restrained against unintentional movement when it is in the use position and when it is in the stowed position. This can be to prevent the armrest from moving in reaction to movements of the vehicle. For example, it is desirable to prevent the armrest from moving away from the stowed position during a sudden deceleration or to prevent the armrest from shaking while driving over an uneven surface. The armrest can be restrained from movement by the use of a latch or a detent that engages a portion of the armrest in order to temporarily hold it in place. It is also desirable that the armrest be relatively easy for an occupant of the vehicle to move between the use position and the stowed position as desired. A latch will have a release available for use by the occupant, while a detent will be releasable by an amount of force that the occupant can easily apply to the armrest. It would be advantageous to have an improved detent to retain an armrest in a predetermined position.

SUMMARY OF THE INVENTION

The invention relates to an armrest assembly. The armrest assembly includes a frame. The armrest assembly also includes an armrest mounted on the frame for relative rotational movement between a first position and a second position. A stop rod is mounted on one of the frame and the armrest. A detent is mounted on the other of the frame and the armrest. The detent includes a first stop indent and a second stop indent. The stop rod is located in the first stop indent when the armrest is in the first position. The stop rod is located in the second stop indent when the armrest is in the second position. The detent includes a deflection arm supported on a detent base. The detent includes an arm space between the deflection arm and the detent base. The detent includes a detent bumper located in the detent space.

The invention also relates to a detent for use with a vehicle armrest. The detent includes a detent base. The detent also includes a deflection arm supported on the detent base. The deflection arm is supported at a first arm connection. The deflection arm is supported at a second arm connection. The first arm connection and the second arm connection are located at opposed ends of the deflection arm. A first projection is located on the deflection arm. The first projection defines one side of a first stop indent. A second projection is located on the deflection arm. The second projection defines one side of a second stop indent. The first projection is located closer to the first arm connection than the second arm connection and is a first distance from the first arm connection. The second projection is located closer to the second arm connection than the first arm connection and is a second distance from the second arm connection. The second distance is smaller than the first distance. The detent also includes an arm space between the deflection arm and the detent base. A detent bumper is located in the arm space.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
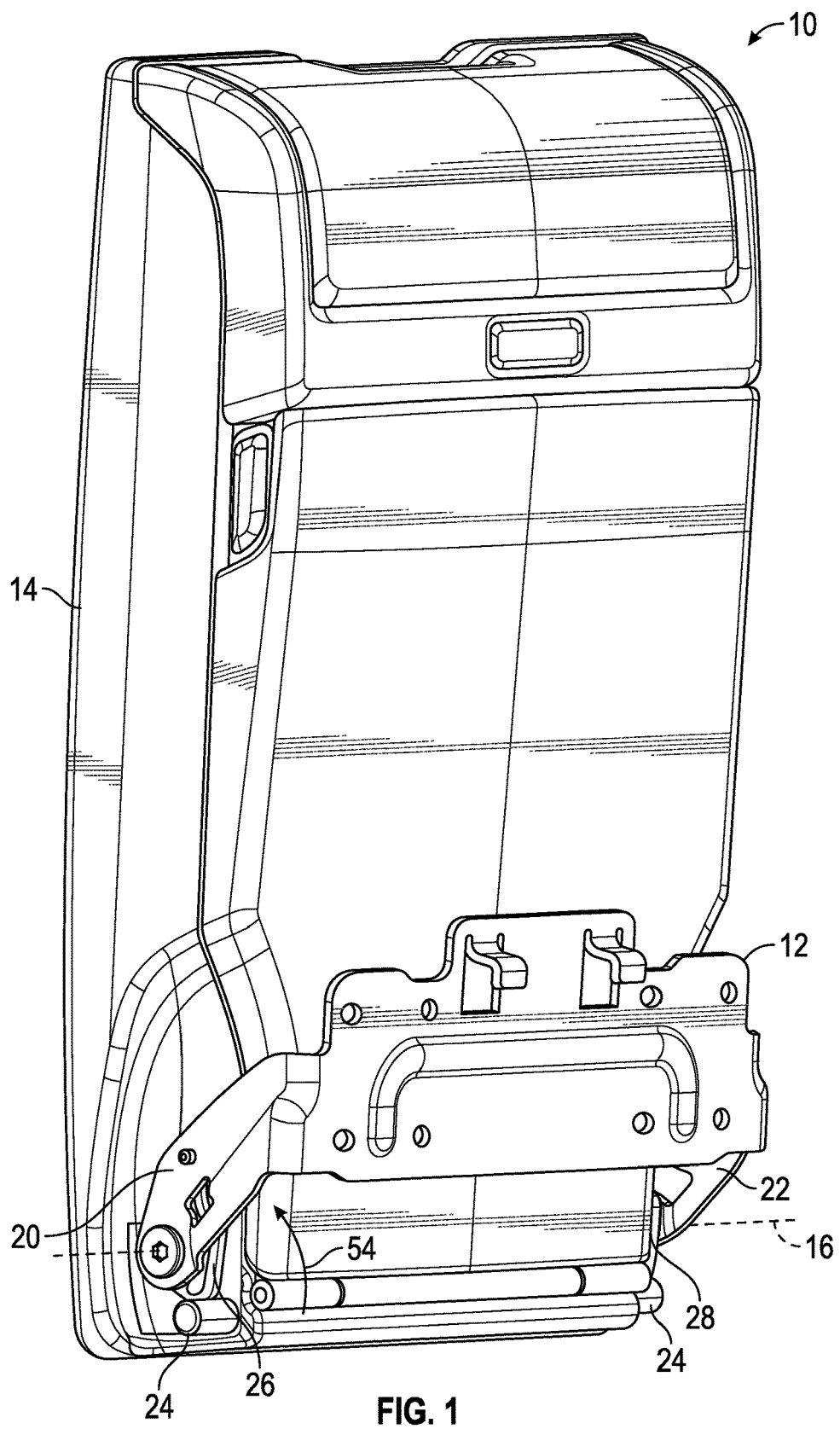
FIG. 1 is a rear perspective view of an armrest assembly that includes an armrest and a frame, wherein the armrest is shown in a stowed position.

Referring now to the drawings, there is illustrated in FIG. 1 an armrest assembly, indicated generally at 10. The illustrated armrest assembly 10 is suitable for use as a center armrest on a bench-type vehicle seat (not shown). However, the armrest assembly 10 may be any desired type of armrest. The armrest assembly 10 includes a frame 12 and an armrest 14 that is mounted to the frame 12 for relative rotational movement about a pivot axis 16. The illustrated frame 12 is a single piece of stamped metal, but may be made of any desired material and by any desired method. The illustrated frame 12 will normally be mounted relative to the vehicle seat in order to install the armrest assembly 10 in a vehicle. However, the frame 12 may be part of a frame of the vehicle seat or any other desired frame. The armrest 14 is adapted to be moved relative to the frame 12 between a raised, stowed position (shown in FIG. 1) and a lowered, use position (not shown), as is well-known in the art.

Figure 2:
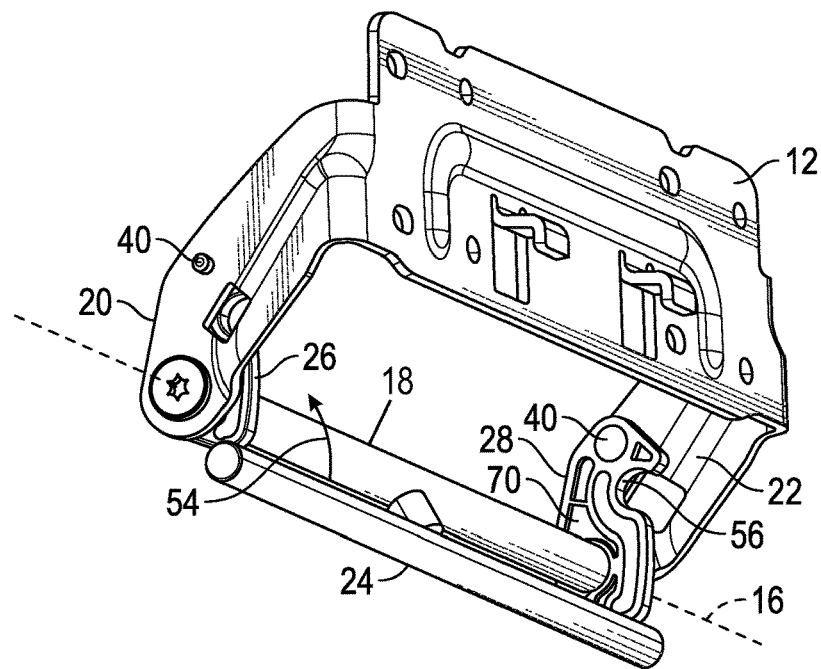
FIG. 2 is an enlarged perspective view from below of a portion of the armrest assembly shown in FIG. 1, wherein an armrest body shown in FIG. 1 has been omitted so that other components of the armrest assembly are clear.

Referring to FIG. 2, an enlarged perspective view of a portion of the armrest assembly 10 is shown. However, most of the armrest 14 is not shown in FIG. 2 for clarity. The armrest assembly 10 includes a pivot rod 18 that extends along the pivot axis 16. The pivot rod 18 is mounted at opposed ends to a first plate 20 and a second plate 22. Each of the first plate 20 and the second plate 22 is a part of the frame 12. The illustrated pivot rod 18 is fixed relative to the armrest 14 and is mounted to rotate relative to the frame 12 about the pivot axis 16. Alternatively, the pivot rod 18 may be fixed relative to the frame 12, and the armrest 14 may rotate relative to the pivot rod 18 about the pivot axis 16, if desired. The illustrated embodiment includes one pivot rod 18 that extends from the first plate 20 to the second plate 22, but the pivot rod 18 may include multiple separate segments and may not extend completely from the first plate 20 to the second plate 22, if desired. The illustrated pivot rod 18 is made of metal, but the pivot rod 18 may be made of any desired material.

The armrest assembly 10 also includes a stop rod 24 that extends substantially parallel to the pivot axis 16. The illustrated stop rod 24 is fixed relative to the armrest 14, and may rotate relative to the frame 12 about the pivot axis 16. Alternatively, the stop rod 24 may be fixed relative to the frame 12, and the armrest 14 may rotate relative to the stop rod 24 about the pivot axis 16, if desired. The illustrated embodiment includes one stop rod 24, but the stop rod 24 may include multiple separate segments if desired. The illustrated stop rod 24 is made of metal, but the stop rod 24 may be made of any desired material.

The armrest assembly 10 also includes a first detent 26 and a second detent 28. In the illustrated embodiment, the first detent 26 is mounted on the first plate 20, and the second detent 28 is mounted on the second plate 22. However, the first detent 26 and the second detent 28 may be mounted in any desired locations. Additionally, in the illustrated embodiment, the armrest 14 rotates relative to both the first detent 26 and the second detent 28 about the pivot axis 16, but the first detent 26 and the second detent 28 may be mounted on the armrest 14 and may rotate relative to the frame 12, if desired.

Figure 3:
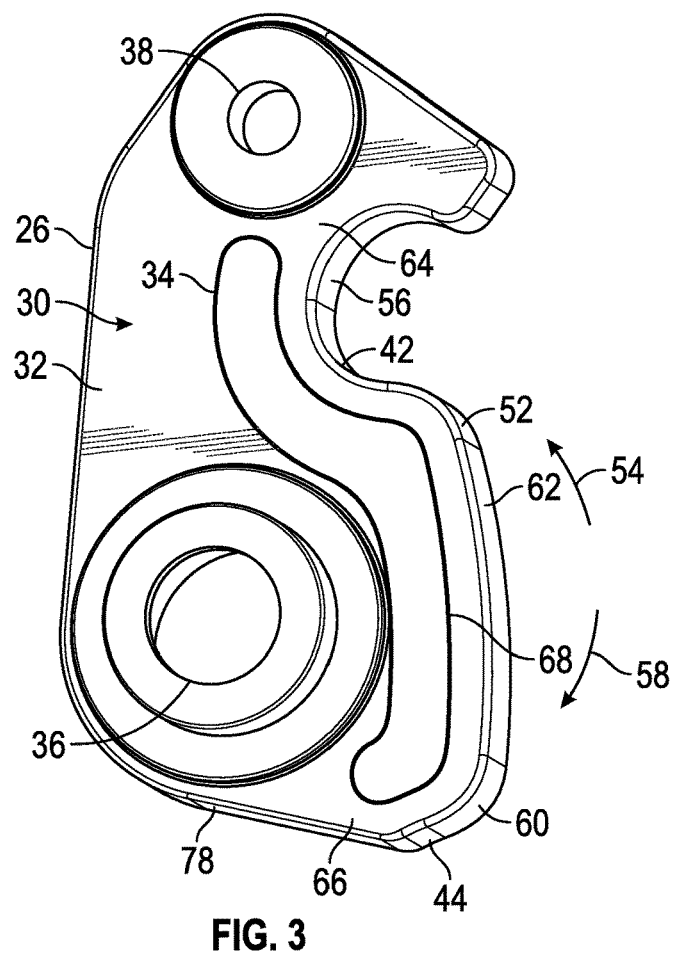
FIG. 3 is an enlarged perspective view of a first detent of the armrest assembly.

Referring now to FIG. 3, an enlarged view of the first detent 26 is shown, looking at a first side 30 of the first detent 26. The first side 30 is the side of the first detent 26 that faces the first plate 20 when the armrest assembly 10 is assembled and is not clearly visible in FIG. 1 or in FIG. 2. In the illustrated embodiment, the first detent 26 and the second detent 28 are mirror-images of each other, and similar features on the second detent 28 are identified by the same number and will not be described separately. The illustrate first detent 26 is molded of a plastic material in a two-shot molding process, but the first detent 26 may be made of any desired material and by any desired process. The first detent 26 includes a detent base 32 that is made of a thermoplastic, but may be made of any desired material. The first detent 26 also includes a detent bumper 34 that is made of a thermoplastic elastomer, but may be made of any desired material. The illustrated detent bumper 34 is made of a softer material than the detent base 32, but may be made of a material with the same hardness as the detent base 32, or a harder material if desired.

The first detent 26 includes a pivot opening 36. The illustrated pivot opening 36 is defined in the detent base 32, but may be in any desired part of the first detent 26. The pivot opening 36 is a circular opening with an inner diameter that is approximately the same size as an outer diameter of the pivot rod 18. However, the pivot opening 36 may have any desired shape and size. When the armrest assembly 10 is assembled, the pivot rod 18 passes through the pivot opening 36. The first detent 26 also includes a pin opening 38. The illustrated pin opening 38 is defined in the detent base 32, but may be in any desired part of the first detent 26. The pin opening 38 is a circular opening, but may have any desired shape. As best understood in reference to FIG. 2, when the armrest assembly 10 is assembled, a detent pin 40 is inserted through the pin opening 38 and fixed to the first plate 20. The illustrated detent pin 40 is made of plastic, but may be made of any desired material. When the armrest assembly 10 is assembled, the first detent 26 is fixed relative to the first plate 20 by the pivot rod 18 and the detent pin 40. It should be appreciated that the pin opening 38 and the detent pin 40 are cooperating structures that serve to retain the first detent 26 on the first plate 20 and prevent movement of the first detent 26 relative to the first plate 20. The pin opening 38 and the detent pin 40 may be replaced with any desired cooperating structure, adhesive, or other desired retainer to keep the first detent 26 in place relative to the first plate 20.

Referring back to FIG. 3, the first detent 26 includes a first stop indent 42 and a second stop indent 44. The first stop indent 42 is the portion of the first detent 26 that the stop rod 24 engages when the armrest 12 is in a first position. In the illustrated embodiment, the first position is the use position. The second stop indent 44 is the portion of the first detent 26 that the stop rod 24 engages when the armrest 12 is in a second position. In the illustrated embodiment the second position is the stowed position. This can best be understood in reference to FIG. which shows the location of the stop rod 24 when the armrest 12 is in the stowed position, and FIG. which shows the location of the stop rod 24 when the armrest 12 is in the use position. Referring back to FIG. 3, the first stop indent 42 includes a generally semi-circular hole defined in the detent base 32. The first stop indent 42 has an inner diameter that is larger than an outer diameter of the stop rod 24.

Figure 5:
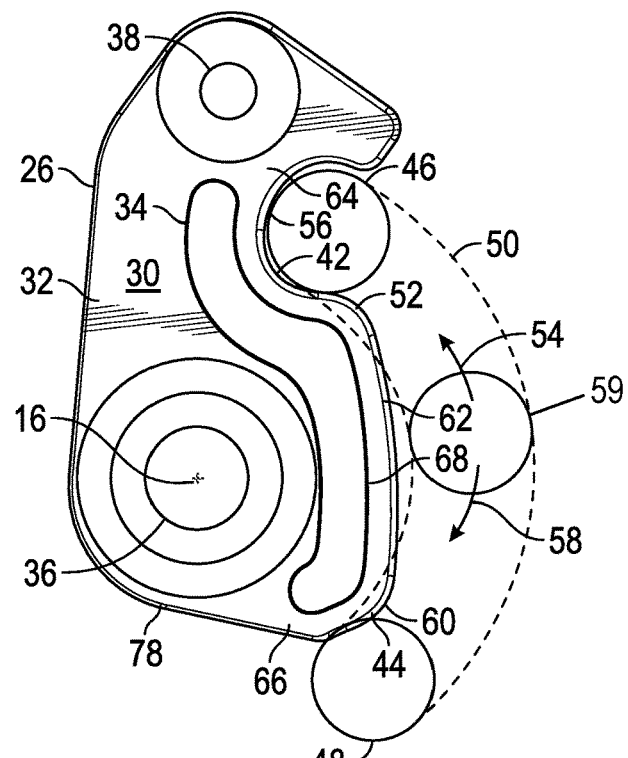
FIG. 5 is a side view of the first detent, showing several positions of a stop rod relative to the first detent.

Referring to FIG. 5, a side view of the first detent 26 is shown. FIG. 5 also shows a first position 46 of the stop rod 24 relative to the first detent 26 when the armrest 12 is in the first position and a second position 48 of the stop rod 24 when the armrest 12 is in the second position. FIG. 5 also shows a rod path 50, which is defined by the positions of the stop rod 24 relative to the first detent 26 when the armrest 12 is moved from the first position 46 to the second position 48. It should be appreciated that the rod path 50 follows a semi-circular arc that is centered on the pivot axis 16.

The first detent 26 includes a first projection 52 that extends into the rod path 50. The first projection 52 is a portion of the detent base 32 and also defines one side of the first stop indent 42. It should be appreciated that when the stop rod 24 is moved in a first direction 54 toward the first stop indent 42, it will initially engage the first projection 52, which will resist further movement of the stop rod 24. The first direction 54 is a rotational direction that is centered on the pivot axis 16. To an operator moving the armrest 12, this will be experienced as a resistance to further movement of the armrest 12 toward the use position.

Figure 6:
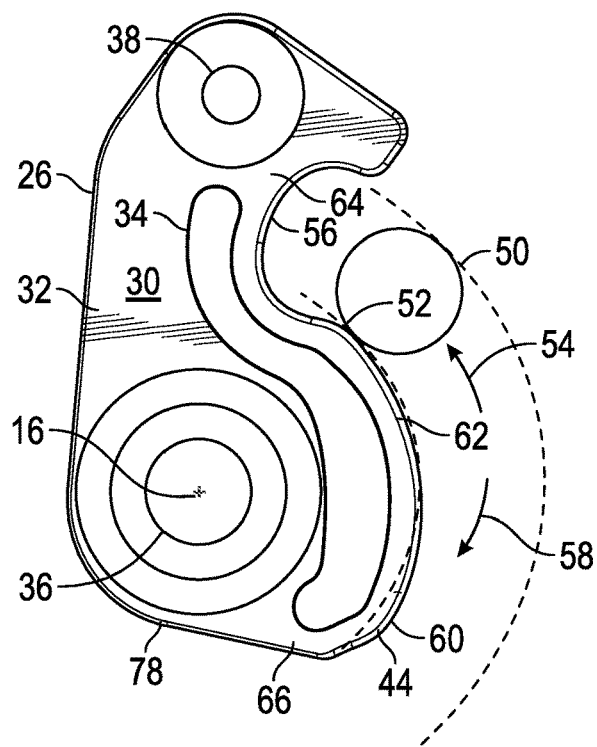
FIG. 6 is a side view similar to that illustrated in FIG. 5, showing the relative position of the stop rod when it engages a first projection on the first detent.

As the armrest 12 continues to be moved in the first direction 54 toward the use position, the stop rod 24 will apply a force on the first projection 52, and the first projection 52 will be deflected out of the rod path 50. This is shown in the side view illustrated in FIG. 6. As previously described, the detent base 32 is made of a relatively hard material, while the detent bumper 34 is made of a relatively soft material. Therefore, the force applied to the first projection 52 by the stop rod 24 will cause the detent bumper 34 to deform, while causing minimal deformation of the detent base 32.

Once the stop rod 24 has moved past the first projection 52 to the first position 46, the first projection 52 will elastically rebound back into the rod path 50 to the position shown in FIG. 5. The stop rod 24 is then located in the first position 46, and the armrest 12 is located in the use position. The first detent 26 includes a stop surface 56 that is located on the opposite side of the first stop indent 42 from the first projection 52. The stop surface 56 engages the stop rod 24 to prevent further movement of the stop rod 24 in the first direction 54 past the first position 46. To an operator moving the armrest 12, this will be experienced as the armrest 12 being stopped once it has reached the use position.

When the operator desires to the move the armrest 12 from the use position to the stowed position, a force is applied to cause the armrest 12 to rotate relative to the pivot axis 16. As seen in FIG. 5, this will cause the stop rod 24 to move relative to the first detent 26 from the first position 46 in a second direction 58. The second direction 58 is a rotational direction that is centered on the pivot axis 16 and is opposite to the first direction 54. When the stop rod 24 is moved from the first position 46 in the second direction 58, it will initially engage the first projection 52, which will resist further movement of the stop rod 24. As the stop rod 24 continues to be moved in the second direction 54, the stop rod 24 will apply a force on the first projection 52, and the first projection 52 will be deflected out of the rod path 50 as described above. The force applied to the first projection 52 by the stop rod 24 will cause the detent bumper 34 to deform while causing minimal deformation of the detent base 32. Once the stop rod 24 has moved past the first projection 52, the first projection 52 will elastically rebound back into the rod path 50 to the position shown in FIG. and the stop rod will be in an intermediate position 59.

When the stop rod 24 is moved farther in the second direction 58, it will engage a second projection 60 that extends into the rod path 50. The second projection 60 is a portion of the detent base 32 and defines one side of the second stop indent 44. To an operator moving the armrest 12, this will be experienced as a resistance to further movement of the armrest 12 toward the stowed position.

Figure 7:
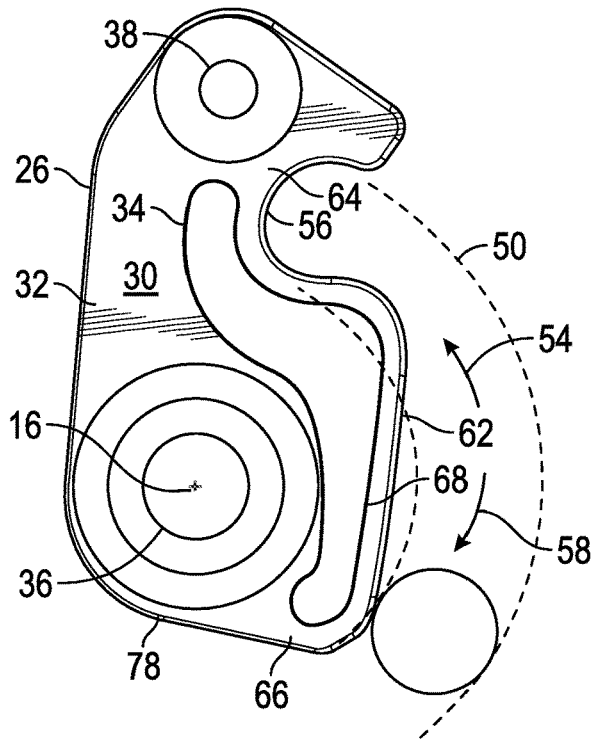
FIG. 7 is a side view similar to that illustrated in FIG. 6, showing the relative position of the stop rod when it engages a second projection on the first detent.

As the armrest 12 continues to be moved toward the stowed position, the stop rod 24 will be moved in the second direction 58 and will apply a force on the second projection 60 that will cause the second projection 60 to be deflected out of the rod path 50. This is shown in the side view illustrated in FIG. 7. The force applied to the second projection 60 by the stop rod 24 will cause the detent bumper 34 to deform, while causing minimal deformation of the detent base 32. Once the stop rod 24 has moved past the second projection 60 to the second position 48, the second projection 60 will elastically rebound back into the rod path 50 to the position shown in FIG. 5. The stop rod 24 is then located in the second position 48 and the armrest 12 is in the stowed position.

The first detent 26 includes a deflection arm 62. The deflection arm 62 is a portion of the first detent 26 that includes the first projection 52 and the second projection 60. The illustrated deflection arm 62 is molded as part of the detent base 32, but may be a separate component, if desired. The illustrated deflection arm 62 is supported on the detent base 32 at a first arm connection 64 and a second arm connection 66, which are located at opposed ends of the deflection arm 62. However, the deflection arm 62 may be connected to the detent base 32 at any desired locations. In the illustrated embodiment, the first projection 52 and the second projection 60 are located between the first arm connection 64 and the second arm connection 66, but they may be located at any desired relative positions. In the illustrated embodiment, the deflection arm 62 has a substantially consistent cross-sectional shape between the first arm connection 64 and the second arm connection 66, but the deflection arm 62 may have any desired cross-sectional shape. An arm space 68 is located between the deflection arm 62 and the detent base 32. In the illustrated embodiment, the arm space 68 is a continuous space from the first arm connection 64 to the second arm connection 66. Additionally, the illustrated arm space 68 has a substantially consistent cross-sectional shape between the first arm connection 64 and the second arm connection 66, but the arm space 68 may have any desired shape and any desired cross-sectional shape. The detent bumper 34 is located in the arm space 68 and, in the illustrated embodiment, the detent bumper 34 fills the entire arm space 68. However, the detent bumper 34 may be any other desired size.

When the vehicle is travelling over uneven surfaces or a bump in a road, it is desirable that the armrest 12 remain in the stowed position when placed in the stowed position by the operator, and also remain in the use position when placed in the use position by the operator. Additionally, it is also desirable that the operator be able to move the armrest 12 between the stowed and use positions as desired with little resistance. The dimensions, material, and other properties of the components of the first detent 26 may be changed as desired in order to obtain desired operating characteristics of the first detent 26. The amount of force required to deflect the first projection 52 out of the rod path 50 will depend on various properties of the deflection arm 62, including, for example, the material the deflection arm 62 is made of, the dimensions of the deflection arm 62, the distance between the first projection 52, the first arm connection 64, and the second arm connection 66, the material the detent bumper 34 is made of, and the dimensions of the detent bumper 34. Similar properties will affect the amount of force required to deflect the second projection 60 out of the rod path 50. Therefore, these properties may be selected to change the amount of force required to deflect the first projection 52 out of the rod path 50 and to deflect the second projection 60 out of the rod path 50.

As best shown in FIG. 5, the first projection 52 is closer to the first arm connection 64 than the second arm connection 66 and is a first distance from the first arm connection 64, while the second projection 60 is closer to the second arm connection 66 than the first arm connection 64 and is a second distance from the second arm connection 66. In the illustrated embodiment, the second distance is smaller than the first distance. In the illustrated embodiment, the amount of force required to deflect the second projection 60 out of the rod path 50 is greater than the amount of force required to deflect the first projection 52 out of the rod path 50. As previously described, when the armrest 12 is in the use position, the stop rod 24 is in the first position 46, and when the armrest 12 is in the stowed position, the stop rod 24 is in the second position 48. Thus, the amount of force that the user applies to move the armrest 12 out of the stowed position is greater than the amount of force that the user applies to move the armrest 12 out of the use position.

Figure 4:
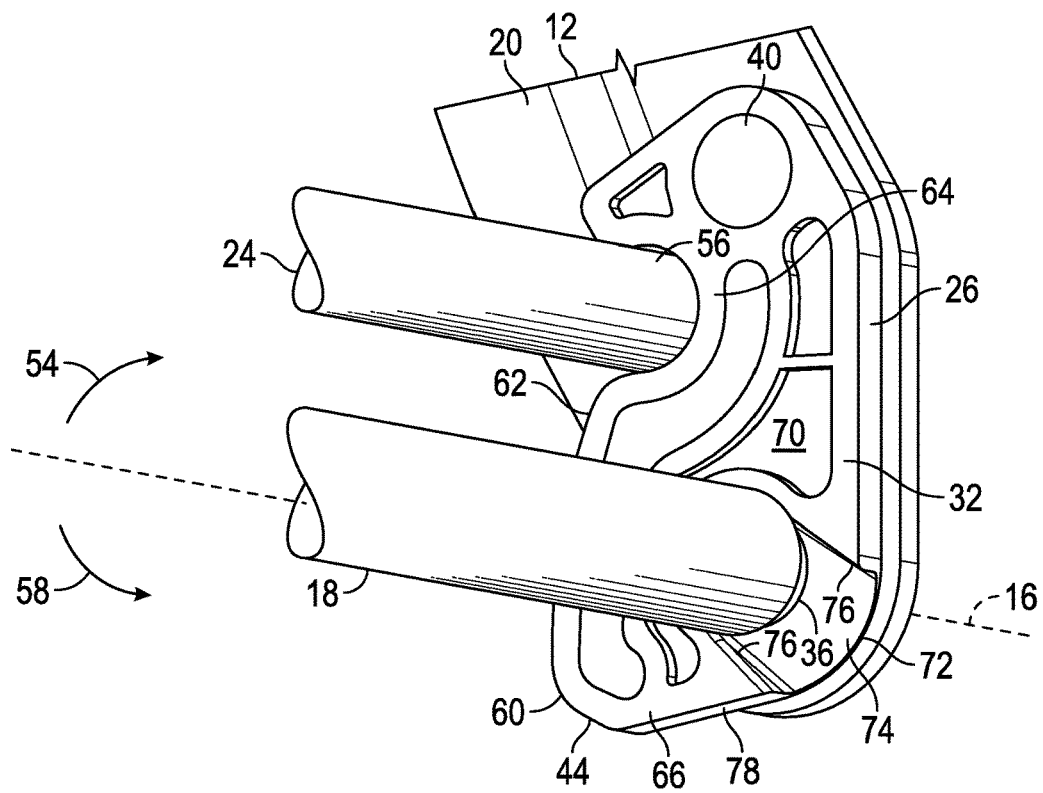
FIG. 4 is an enlarged perspective view of the first detent of the armrest assembly shown in FIGS. 2 and 3, shown from the opposite side of the armrest assembly.

Referring back to FIG. 4, a view of a second side 70 of the first detent 26 is shown. The second side 70 is the side of the first detent 26 that faces away from the first plate 20 when the armrest assembly 10 is assembled. The second side 70 of the second detent 28 is visible in FIG. 2. The first detent 26 includes a guide indent 72 defined on the second side 70. The guide indent 72 serves to help in properly inserting the pivot rod 18 into the pivot opening 36 of the first detent 26 during assembly of the armrest assembly 10. The guide indent 72 includes a guide surface 74 that is offset from the second side 70 of the first detent 26, and the guide indent 72 includes side surfaces 76 that connect the guide surface 74 with the second side 70. The guide indent 72 extends from the pivot opening 36 to an edge 78 of the first detent 26. In the illustrated embodiment, the guide indent 72 and the deflection arm 62 are on opposite sides of the pivot opening 36. However, the guide indent 72 and the deflection arm 62 may be in any desired relative positions on the first detent 26.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An armrest assembly comprising:
   a frame;
   an armrest mounted on the frame for relative movement between a first position and a second position;
   a stop rod mounted on one of the frame and the armrest; and
   a detent mounted on the other of the frame and the armrest, the detent including a detent base having a first stop indent, a second stop indent, and a deflection arm that defines an arm space between the deflection arm and the detent base, wherein:
   (1) the stop rod is located in the first stop indent when the armrest is in the first position:
   (2) the stop rod is located in the second stop indent when the armrest is in the second position; and
   (3) the stop rod deflects the deflection arm relative to the detent base into the arm space when the armrest is moved between the first and second positions, wherein a detent bumper is located in the detent space.

2. The armrest assembly of claim 1, wherein the detent bumper fills the entire arm space.

3. The armrest assembly of claim 1, wherein the deflection arm is supported on the detent base at a first arm connection and a second arm connection that are located at opposed ends of the deflection arm.

4. The armrest assembly of claim 3, wherein the deflection arm includes a first projection that defines one side of the first stop indent and a second projection that defines one side of the second stop indent.

5. The armrest assembly of claim 4, wherein each of the first and second projections extends into a rod path that is defined by the stop rod when the armrest is moved between the first and second positions.

6. The armrest assembly of claim 5, wherein the first projection is located closer to the first arm connection than the second arm connection and is a first distance from the first arm connection, the second projection is closer to the second arm connection than the first arm connection and is a second distance from the second arm connection, and the second distance is smaller than the first distance.

7. The armrest assembly of claim 6, wherein the arm space is continuous from the first arm connection to the second arm connection.

8. The armrest assembly of claim 5, wherein the detent further includes a stop surface located on the opposite side of the first stop indent from the first projection, and wherein the rod path extends to the stop surface.

9. An armrest assembly comprising:
   a frame;
   an armrest mounted on the frame for relative movement between a first position and a second position;
   a stop rod mounted on one of the frame and the armrest; and
   a detent mounted on the other of the frame and the armrest, the detent including a deflection arm that defines an arm space between the deflection arm and the detent base, wherein the stop rod deflects the deflection arm relative to the detent base into the arm space when the armrest is moved between the first and second positions, wherein a detent bumper is located in the detent space.

10. The armrest assembly of claim 9, wherein the detent bumper fills the entire arm space.

11. The armrest assembly of claim 9, wherein the deflection arm is supported on the detent base at a first arm connection and a second arm connection that are located at opposed ends of the deflection arm.

12. The armrest assembly of claim 11, wherein the deflection arm includes a first projection that defines one side of the first stop indent and a second projection that defines one side of the second stop indent.

13. The armrest assembly of claim 12, wherein each of the first and second projections extends into a rod path that is defined by the stop rod when the armrest is moved between the first and second positions.

14. The armrest assembly of claim 13, wherein the first projection is located closer to the first arm connection than the second arm connection and is a first distance from the first arm connection, the second projection is closer to the second arm connection than the first arm connection and is a second distance from the second arm connection, and the second distance is smaller than the first distance.

15. The armrest assembly of claim 14, wherein the arm space is continuous from the first arm connection to the second arm connection.

16. The armrest assembly of claim 13, wherein the detent further includes a stop surface located on the opposite side of the first stop indent from the first projection, and wherein the rod path extends to the stop surface.

* * * * *